(12) United States Patent
Avital et al.

(10) Patent No.: US 8,787,228 B2
(45) Date of Patent: Jul. 22, 2014

(54) METHOD APPARATUS AND SYSTEM FOR REDUCING POWER CONSUMPTION OF A WIRELESS DEVICE

(75) Inventors: Shlomo Avital, Doar N'a Harie Yehuda (IL); Miri Ratner, Ramat-Gan (IL); Ofer Markovits, Haifa (IL); Giora Rayzman, Portland, OR (US); Eran Sudak, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 862 days.

(21) Appl. No.: 12/710,600

(22) Filed: Feb. 23, 2010

(65) Prior Publication Data

US 2011/0205946 A1  Aug. 25, 2011

(51) Int. Cl.
*H04W 88/02* (2009.01)
*H04W 36/00* (2009.01)

(52) U.S. Cl.
CPC ............ *H04W 36/0083* (2013.01); *Y02B 60/50* (2013.01)
USPC .......................... 370/311; 455/574; 455/127.5

(58) Field of Classification Search
USPC ......................................... 370/311; 455/127.5
See application file for complete search history.

(56) References Cited

U.S. PATENT DOCUMENTS

| | | | |
|---|---|---|---|
| 8,019,296 B1* | 9/2011 | Durig | 455/127.4 |
| 2006/0172736 A1* | 8/2006 | Nevo | 455/435.1 |
| 2007/0230401 A1* | 10/2007 | Rayzman et al. | 370/331 |
| 2009/0143078 A1* | 6/2009 | Tu et al. | 455/456.3 |
| 2009/0231225 A1* | 9/2009 | Choudhury et al. | 343/770 |

* cited by examiner

*Primary Examiner* — Huy D Vu
*Assistant Examiner* — Teisha D Hall
(74) *Attorney, Agent, or Firm* — Shichrur & Co.

(57) ABSTRACT

A method, apparatus and a wireless communication system to reduce power consumption of a wireless Multicomm device by using a location-aware scanning for detecting WLAN networks. The location awareness is obtained from a base station identifier of a wireless wide area network (WWAN) and is based on a preconfigured database that associates WWAN BS IDs with potential WLAN networks.

14 Claims, 4 Drawing Sheets

METHOD APPARATUS AND SYSTEM FOR REDUCING POWER CONSUMPTION OF A WIRELESS DEVICE

BACKGROUND OF THE INVENTION

A wireless Multicomm device may be defined as a network adapter that combines more than one wireless technology. The different wireless communication technologies may share some of the hardware components on the device, for example, a radio, antennas and the like.

The wireless Multicomm device may include a control entity that may be referred as Multicomm Controller (MCC), that may be implemented by hardware, software or by a combination of hardware and software. The Multicomm controller is used to coordinate the operation of the different wireless technologies of the Multicomm device. The different wireless technologies which may share the Multicomm device may include WiFi as defined by IEEE 802.11 standard family, WiMAX, as defined by IEEE 802.16 standard family, Long Term Evolution (LTE), 3G, as defined by the 3GPP alliance, Bluetooth or the like.

Some wireless communications, when operated on the Multicomm device, may consume a major portion of the power supply (e.g., battery power). For example, a WiFi unassociated scan is a major power consumer in the platform.

A user moves in "fixed routes" for example, from home to office to café to campus and back home, if desired. On the route, between the stops, the user may be connected to wireless wide area network (WWAN) e.g., 2G, 3G, WiMAX, LTE. However, when the user is in vicinity of a "stop" in his daily route the expected behavior may be to connect to the WiFi network in order to gain higher bandwidth while reducing the load on WWAN infrastructure.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
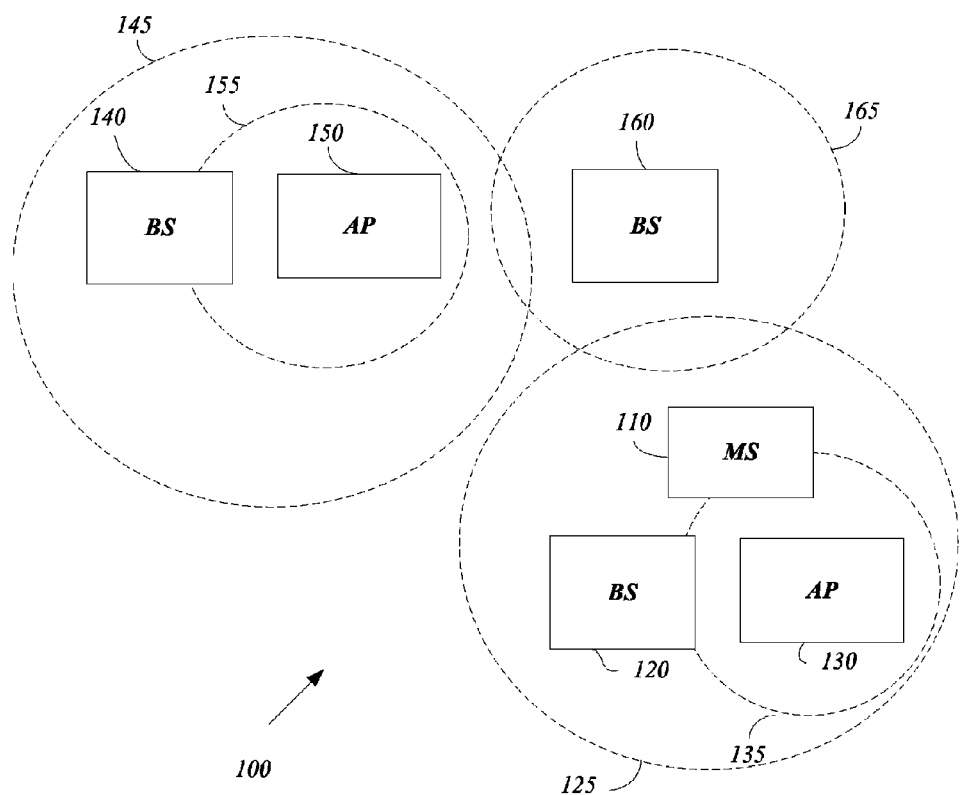
FIG. 1 is an illustration of a portion of a wireless communication network according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals. These algorithmic descriptions and representations may be the techniques used by those skilled in the signal processing arts or/and in wireless communication arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer and/or computing system and/or medium access controller (MAC) and/or communication processor, or similar electronic computing device, that manipulates and/or transforms data represented as physical, such as electronic, quantities within the computing system's registers and/or memories into other data similarly represented as physical quantities within the computing system's memories, registers or other such information storage, transmission or the like. In addition, the term "plurality" may be used throughout the specification to describe two or more components, devices, elements, parameters and the like. For example, "plurality of mobile stations" describes two or more mobile stations. The term "roam" and/or "roaming" may be defined as the ability for a mobile station (MS) to automatically make and receive voice calls, send and receive data, or access other services, including home data services, when travelling outside the geographical coverage area of the home network, for example by using a visited network. For example, a MS of wireless wide area network (WWAN) and/or cellular network may start a call and/or service when associated with a first WWLAN and may move during this call and/or service to a second WWLAN without losing the connection and end the call and/or service when associating with a third WWLAN.

It should be understood that the present invention may be used in a variety of applications. Although the present invention is not limited in this respect, the circuits and techniques disclosed herein may be used in many apparatuses such as communication devices of a radio system. The communication devices intended to be included within the scope of the present invention include, by way of example only, mobile stations, base stations and access points of radio systems such as, for example wireless local area network (WLAN) which also may be referred as WiFi, wireless metropolitan area network (WMAN) which also may be referred as WiMAX, a wireless personal area network (WPAN) such as, for example Bluetooth™, two-way radio transmitters, digital system transmitters, analog system transmitters, cellular radiotelephone transmitters, digital subscriber lines, LTE cellular systems and the like.

Some embodiments of the invention may be implemented, for example, using a machine-readable medium such as for example a memory circuit and/or an article which may store an instruction and/or a set of instructions that, when executed by a machine, cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, assembly language, machine code, or the like.

In accordance with embodiments of the invention, a channel and/or an air link may be a physical transfer medium. The physical transfer medium may be used to transfer signals such as, for example, informative data signals, training signals, pilot signals, sub-carriers signals, preamble signals and the like, that may be modulated by one or more modulation scheme. Furthermore, the channel and/or the air link may be a combination of the physical transfer medium, components of the transmitter and/or the receiver, for example path loss, noise, interference or the like. It should be understood to the skilled artisan that embodiments of the invention may operate with many types of signals, which partially mention above, and the invention is in no way limited to the above mentioned signals.

Turning first to FIG. 1 an illustration of a portion of a wireless communication system 100 according to exemplary embodiment of the invention is shown. Although the scope of the present invention is not limited to this example, wireless communication system 100 may include a combination of a wireless wide area networks (WWAN) 125, 145 and 165 and a wireless local area networks (WLAN) 135 and 155, if desired. For example, each of WWAN 125, 145 and 165 may include at least one of a WiMAX system, an LTE system, a cellular 3G and/or 2G system or the like. Each of WLANs 135 and 155 may include a WiFi system as defined by IEEE 802.11 standard family. For example, WWAN 125 may include a mobile station (MS) 110, base stations (BS) 120. WWAN 145 may include BS 140 and WWAN 165 may include BS 160. WLAN 135 may include access points (AP) 130 and MS 110. WLAN 155 may include AP 150, if desired.

Although the scope of the present invention is not limited in this respect, MS 110 may include a Multicomm device which is able to operate for example, by simultaneously connecting with both a wide area wireless network and a local area network, if desired.

In operation, and according to this example, dotted circles 125, 145 and 165 are used to show both the WWANs and WLANs as described above and to depict a communication coverage range of BSs 120, 140 and 160, respectively. It should be understood that in other embodiments of the invention the coverage range of BS and AP may be smaller or larger then the WWAN and/or WLAN coverage. Dotted circles 135 and 155 depict a communication coverage range of APs 130 and 150, respectively. Locations of APs 130 and 150 and/or WLAN ID may be stored in a database of MS 110. MS 110 may perform an unassociated scan with WLAN networks having APs in the vicinity of the BS(s) and may not scan or may avoid scanning if there is no WLAN ID stored in the MS database, although the scope of the present invention is not limited to this embodiment.

MS 110 may roam from BS 120 to BS 160 and to BS 140, if desired. According to this example, when MS 110 roams from BS 160 to BS 120, MS 110 may connect or associate with BS 120 and may scan WLAN 135 in order to connect to or associate with AP 130. According to another example, when MS 110 roams to BS 160 it may not scan or may avoid scanning for a WLAN since there is no indication in the MS database that such network available. Advantageously, scanning for a WLAN as described above may improve the overall MS system power consumption, by explicitly executing WLAN scan when the Multicomm device is in a vicinity of a previously known WLAN (without damaging the WLAN network detection performance) rather than constantly executing periodic WLAN unassociated scan, if desired.

Figure 2:
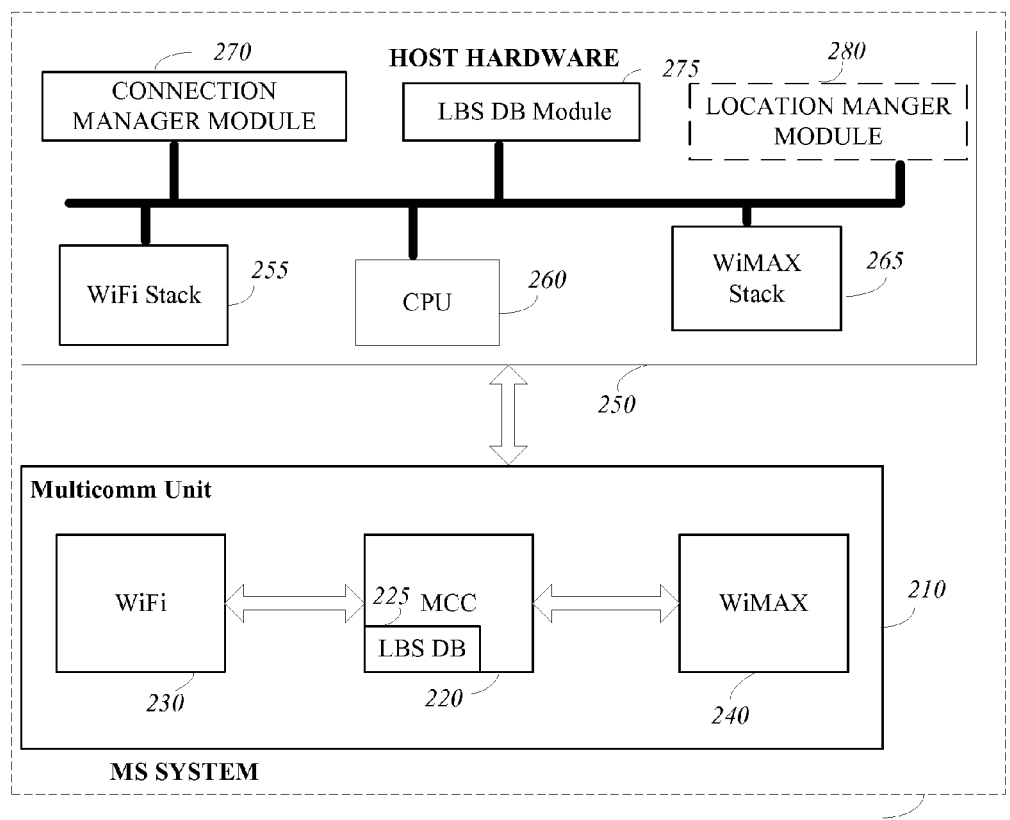
FIG. 2 is an illustration of a mobile station system according to an exemplary embodiment of the present invention.

Turning to FIG. 2, an illustration of a mobile station system 200 according to one exemplary embodiment of the present invention is shown. According to this exemplary embodiment, MS system 200 may be or include for example, a laptop computer, netbook computer, a personal mobile device, a cell phone or the like. MS system 200 may include a Multicomm unit 210 and host hardware 250.

According to one embodiment, Multicomm unit 210 may include a WLAN module (e.g., WiFi) 220, a Multicomm controller (MCC) 230 and a wireless WWAN module (e.g. WiMAX) 240. MCC 230 may include an LBS DB 225, although the scope of the present invention is not limited in this respect.

Furthermore, host hardware 250 may include hardware components such as, for example, a Central Processing Unit (CPU) 260 and persistent database (LBS DB 275), and software blocks such as, for example, a WWAN software stack (e.g. WiMAX stack) 255, a WLAN software stack (e.g., WiFi stack) 265, a connection manager (CM) 270 and an optional location manager module 280, although the scope of the present invention is not limited to this example. Each of the software blocks may be implemented in hardware as specific components, or for example when instructions in the software are executed by a processor.

According to embodiments of the invention CM 270 is a software entity that manages the establishment of wireless connections and handover between wireless technologies for example, between WiMAX to WiFi, if desired. For example, host hardware 250 may be a hardware of a laptop and which may communicate with Multicomm unit 210 in order to establish a connection to the Internet, if desired. CM 270 may manage the establishment of the connection by using location manager module 280 to determine the location of MS system 210 and based on the location or using the location may search LBS DB 275 for a BS and/or an AP, if desired. CM 270 may use WLAN stack 255 and/or WWAN stack 260 to process data received from WLAN module 230 and/or WWAN 240 in order to establish connection to the Internet.

According to this exemplary embodiment, the physical connection to the Internet may be established by Multicomm unit 210. For example, Multicomm unit 210 may establish a connection with a BS of the WWAN. WWAN module 240 may receive a BS ID of the connected BS. MCC 225 may search LBS DB 225 for a WLAN ID (e.g., SSID) in the close vicinity of the WWAN BS and if found may instruct WLAN module 230 to scan the WLAN in order to establish a connection to the WLAN, although it should be understood that the scope of the present invention is not limited to this example.

Figure 3:
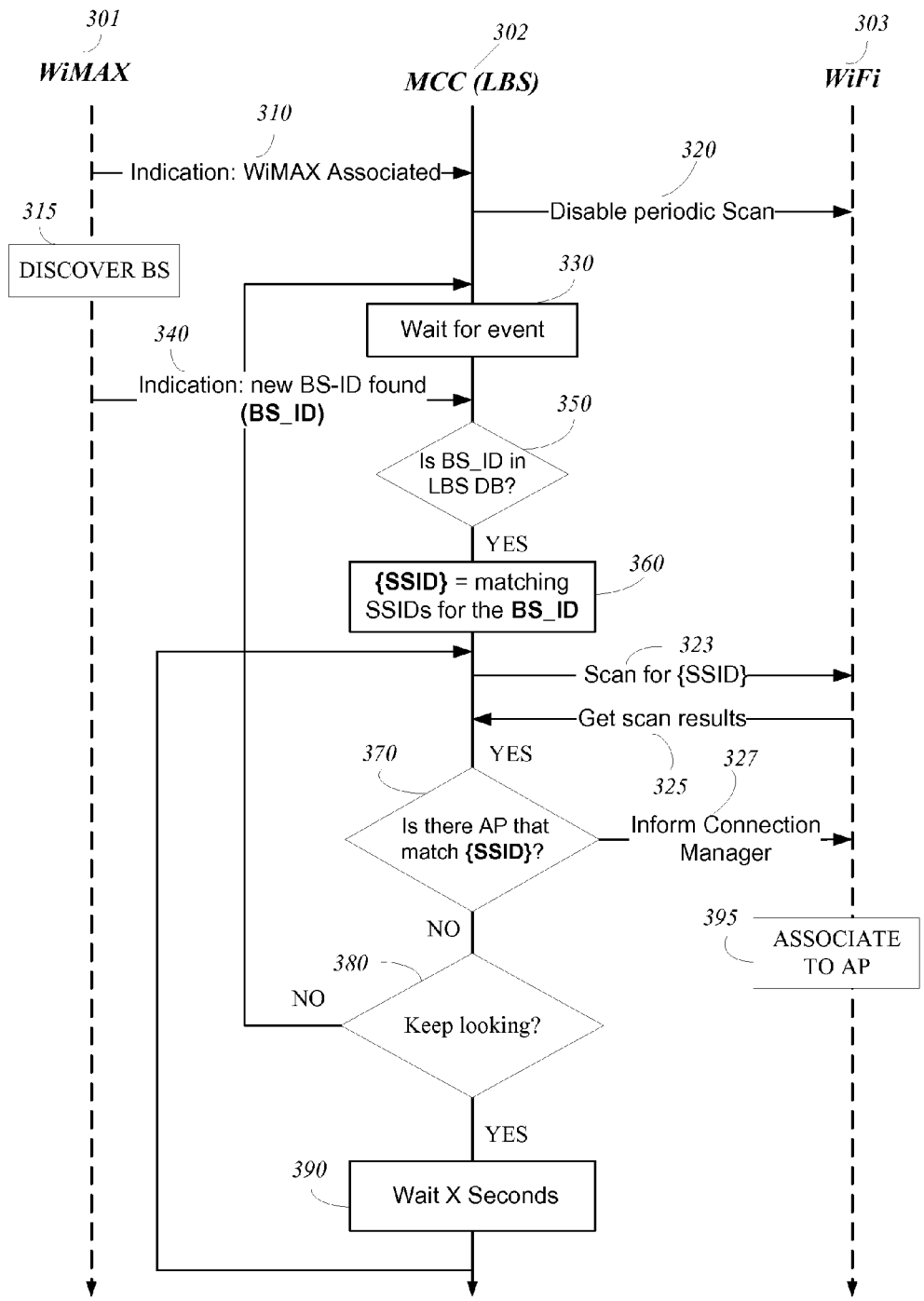
FIG. 3 is an illustration of a flowchart of a method of reducing a power consumption of a wireless device according to an exemplary embodiment of the invention.

Turning to FIG. 3 an illustration of a flowchart of a method of reducing a power consumption of a wireless device according to exemplary embodiments of the invention is shown. The flowchart describes the operation of a WiMAX entity 301 (shown with a vertical doted line) an MCC operation 302 and a WiFi entity 303 operation (shown with a vertical doted line).

According to embodiments of the invention, a service set identifier (SSID) is a sequence of characters that uniquely names a wireless local area network. For example, the SSID may be referred to as a "network name."

Embodiments of the invention may include a plurality of SSIDs that cover same location, and a plurality of BS IDs, if desired. An LBS DB (e.g., LBS DB 125) may be created by a self learning of the route of the Multicomm device (e.g., Multicomm device 200) and/or manually by the user and/or by any other methods known in the art. For example, the user may store a plurality of BS IDs with their associated network ID for example SSID and/or AP ID, if any.

According to embodiment of the present invention the method of reducing a power consumption of a wireless Multicomm device may use a location-aware scanning for WLAN networks. The location awareness (e.g., the location) may be obtained from a base station identifier (SSID) of a wireless wide area network (WWAN) and may be based on a preconfigured database that associate wireless wide area base station identifiers (WWAN BS ID) with potential WLAN networks. Other location detection methods may be used.

For example, the method may start by searching a preconfigured database (e.g., LBS DB 125) that associates the WWAN BS ID with WLAN network identifiers (e.g. SSID) in a vicinity of a base station of WWAN. The WWAN BS may perform a scanning of the WLAN if the WLAN was found in the vicinity of the base station. Furthermore, the method may disable an unassociated scan for WLAN network if no WLAN found in the LBS DB and/or in the vicinity of the WWAN BS.

The method may start by WiMAX 301 sending an association message (message 310) to MCC 302. Upon receiving the message MCC 302 may send a message (message 320) to disable the periodic scan of WiFi 303. Thus, when the Multicomm device is associating with a WWAN its disassociating from the WLAN and may disable an unassociated scan of the WLAN by WiFi entity 303, although the scope of the present invention is not limited in this respect.

The method may start by MCC 302 waiting for an event (text box 330). An example of an event may be WiMAX 301 discovering a new BS (text block 315) and may provide the BS_ID to the MCC (message 340). MCC 302 may try to find this BS_ID in its LBS_DB (diamond 350). If there is a match of the BS ID with a stored BS ID, MCC 302 may retrieve associated SSIDs to the BS ID at the LBS DB (text box 360), if desired.

Although the scope of the present invention is not limited in this respect, if there is SSID associated to the stored BS ID, MCC 302 may send a message (message 323) to WiFi entity 303 to trigger an explicit WiFi scan (in order to check whether there is a WiFi network available with preconfigured profile). WiFi entity 303 may reply with the list of found SSIDs (e.g. message 325). If the found SSIDs match any stored SSID (diamond 370), the MCC 302 may inform a connection manager, for example CM 290 (message 327), to associate to or connect to the WiFi network. For example, the CM than may connect to the WiFi network in several ways such as, for example, waking the system from a sleep mode, a device-host interrupt or the like. WiFi entity 303 may associate with the AP (text box 385. If a match of SSID is not found (diamond 370), MCC 302 may keep scanning the WiFi network (diamond 380). MCC 302 may wait a predetermined time interval for example, 30 seconds second (text box 390).

Advantageously, when WiMAX is associated, the method may reduce the number of times a WiFi unassociated scan is executed. Since WiFi unassociated scans are a major power consumer, the result may be improved overall system power consumption. Furthermore, using embodiments of the invention may shorten the average time it takes to detect a WiFi network, as a result it improves swiftness of the WiMAX to WiFi handoff.

Figure 4:
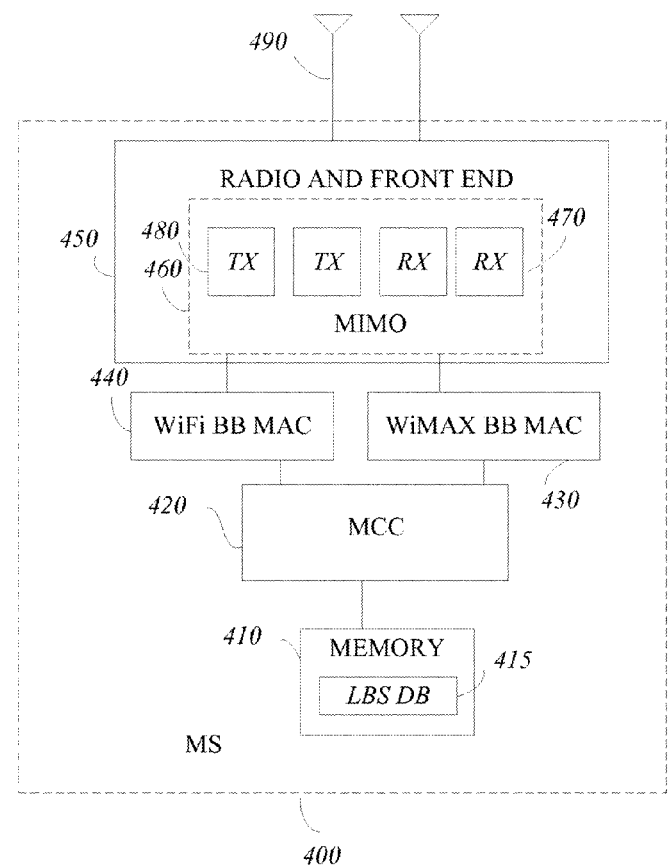
FIG. 4 is an illustration of a Multicomm device according to an exemplary embodiment of the invention.

FIG. 4 is an illustration of a Multicomm device according to an exemplary embodiment of the invention.

According to one exemplary embodiment of the invention MS 400 may include a memory 410, a MultiComm controller (MCC) 420, a wide area network baseband (BB) medium access controller (MAC) 430 e.g., WiMAX BB, a local area network BB 440 e.g., WiFi BB, a radio and front end 450 which includes a multiple-input-multiple-output (MIMO) transmitters receivers system 460 and a plurality of antennas 490.

According to this exemplary embodiment, memory 410 may include a Flash memory to store a Location Base Service Data Base (LBS DB) 415, if desired. With embodiments of the invention, LBS DB 415 may include groups of {WiFi AP SSIDs}:{WiMAX BS IDs}. LBS DB 415 may include additional parameters that may be associated with each BS identifier (ID) e.g., different parameters for each BS ID, although it should be understood that the present invention is not limited in this respect.

According to embodiment of the invention, MCC 420 may control a scanning procedure of both WLAN BB MAC 440 and WWAN BB MAC 430 according location information of WWAN BSs and WWAN APs and another network information that may be stored in LBS DB 415. MCC 420 may be implemented by software, by hardware and any combination of software and hardware. WWAN BB MAC 430 may include an encoder, a decoder, a modulator, a demodulator, a medium access controller (MAC) and the like. WWAN BB MAC 430 may include a WiMAX BB, an LTE BB, a cellular BB, or the like. WWAN BB MAC 430 may be designed to process signals of an Orthogonal Frequency Division Multiple Access (OFDMA), OFDM, Code Division Multiple Access (CDMA) a single carrier frequency division multiple access (SC-FDMA) or the like. WWAN BB MAC 430 may be implemented by hardware, by software or any combination of hardware and software.

WLAN BB MAC 440 may include a WiFi BB MAC for example the WiFi BB MAC may be implemented according to IEEE 802.11 standard, if desired. WLAN BB MAC 440 may be designed to process signals of an Orthogonal Frequency Division Multiple Access (OFDMA), OFDM, Code Division Multiple Access (CDMA) or the like. WLAN BB MAC 150 may be implemented by hardware, by software or any combination of hardware and software.

Although the scope of the present invention is not limited to this exemplary embodiment of the invention, radio and front end 450 may be used to transmit and receive signals from both WWAN and WLAN, if desired. For example, radio and front end 450 may include MIMO 460. This exemplary MIMO 460 may include at least two transmitters (TX) 480 and at least two receivers (RX) 470. Antennas 166 may include a dipole antenna, an antenna array, an internal antenna or the like.

According to one example, WiMAX BB MAC 430 may associate or be connected with a BS (e.g., BS 120) and WiFi BB MAC 440 may associate or be connected with an AP which is located in the near vicinity of the WiMAX BB (e.g., AP 130), if desired. MCC 420 may instruct WiFi BB MAC 440 to disable its unassociated scan, if desired. MCC 420 may command WiMAX BB MAC 440 to scan the WWAN and to receive for example, a BS ID from the BS (e.g., BS ID of BS 120). In addition, MCC 420 may command WiFi BB MAC 440 to associate to the WLAN (identified by SSID) based on a match of the BS ID to a stored BS ID which is associated with the stored SSID. The stored BS ID and the stored SSID may be stored in LBS DB 225, if desired.

MCC 420 may compare the received BS ID for example the BS ID of BS 170 and the stored BS ID. If there is a match, the MCC 420 may command WiFi BB MAC 440 to scan for WLAN and compare a found AP SSID to the stored SSID and based on a match with the stored SSID to associate with the WLAN, if desired.

However, when MS 110 roams to BS 180 the scanning of the local area network may be avoided or prevented because LBS DB may indicated that there is no known SSID associated with the stored BS ID, although the scope of the present invention is not limited in this respect.

Embodiments of the invention may include a plurality of SSIDs that cover the same location, and a plurality of BS IDs, if desired. An LBS DB (e.g., LBS DB 125) may be created by a self learning of the route of the Multicomm device (e.g., Multicomm device 200) and/or manually by the user and/or by any other methods known in the art. For example, the user may store plurality of BS IDs with their associated network ID for example SSID and/or AP ID if any.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of location-aware scanning by a wireless Multicomm device, the method comprising:
    scanning a wireless wide area network (WWAN) to detect a WWAN base station (BS) having a detected BS identifier;
    searching for the detected BS identifier in a preconfigured database that associates one or more wireless wide area network (WWAN) base station (BS) identifiers (IDs) of one or more WWAN base stations with one or more Wireless Local Area Network (WLAN) Service Set Identifiers (SSIDs) of one or more WLANs in a vicinity of the WWAN base stations;
    if a WLAN Service Set Identifier (SSID) of at least one WLAN in a vicinity of the WWAN BS is found, based on said searching, scanning for the at least one WLAN; and
    if no WLAN SSID of at least one WLAN in the vicinity of the WWAN BS is found, based on said searching, selecting not to perform WLAN scanning.

2. The method of claim 1, comprising:
    scanning for a particular WLAN, which is associated in the database with the detected BS identifier.

3. The method of claim 1 comprising:
    associating to a particular WLAN based on a match of the detected base station identifier to a stored base station identifier, and based on a stored local area identifier which is associated with the stored base station identifier.

4. The method of claim 1 comprising:
    storing in the database a plurality of base station identifiers of a plurality of WWAN base stations; and
    storing in association with an identifier of a WWAN base station, one or more WLAN identifiers, of one or more local area networks, which are in a vicinity of the base station.

5. The method of claim 1 comprising:
    comparing a particular WLAN SSID to a stored WLAN SSID, and based on a matching between the particular WLAN SSID and the stored WLAN SSID associating with the particular WLAN and disassociating from the WWAN.

6. The method of claim 1 comprising:
    avoiding WLAN scanning if there is no WLAN SSID stored in the database in association with the detected WWAN base station identifier.

7. A wireless communication device comprising:
    a multiple-input-multiple-output (MIMO) communication system;
    a first baseband and medium access controller (MAC) to associate with a wide area wireless network (WWAN) base station;
    a second baseband and MAC to associate with a wireless local area network (WLAN) access point (AP);
    a database to store one or more WWAN base station (BS) identifiers (IDs) of one or more WWAN base stations in association with one or more WLAN Service Set IDs (SSIDs) of one or more WLANs in a vicinity of the WWAN base stations; and
    a controller to perform a location-aware scan by disabling periodic WLAN scanning, scanning the WWAN to receive a detected base station identifier of a detected BS, searching for the detected BS identifier in the database, and scanning for a particular WLAN which is associated in the database with the detected BS identifier, wherein the controller is to avoid WLAN scanning if there is no WLAN identifier stored in the database in association with the detected base station identifier.

8. The wireless communication device of claim 7, wherein the database comprises:
    a location base service database (LBS DB) to store a plurality of base station identifiers and one or more WLAN identifiers associated with one or more of the plurality of base station identifiers.

9. A wireless communication system comprising:
    a host system comprising:
    a location-based service data base (LBS DB) to store a plurality of base station identifiers in association with one or more wireless local area network (WLAN) identifiers, if any; and
    a Multicomm unit comprising:
    a first baseband and medium access controller (MAC) to associate with a wide area wireless network (WWAN) base station;
    a second baseband and MAC to associate with a WLAN access point; and
    a controller to disable periodic WLAN scanning, to scan the WWAN, to receive a detected base station identifier, to search for the detected BS identifier in the database, and to scan for a particular WLAN which is associated in the database with the detected BS identifier, wherein the controller is to avoid WLAN scanning if there is no WLAN identifier stored in the database in association with the detected base station identifier.

10. The wireless communication device of claim 9, wherein the controller is able to command the second baseband and MAC to scan for a particular WLAN, which is associated in the database with the detected BS identifier.

11. The wireless communication system of claim 9, wherein the host system comprises:
    a central processing unit operably coupled to a location manager module to determine a location of the wireless communication system and based on the location, to search the LBS DB for a WLAN identifier in a near vicinity of the location.

12. The wireless communication system of claim 11, wherein the host system comprises:
    a connection manager to manage an establishment of a network connection via the WLAN based on the location.

13. The wireless communication system of claim 9 comprising a laptop computer.

14. The wireless communication system of claim 9 comprising a netbook computer.

\* \* \* \* \*